Feb. 19, 1929.                                                    1,702,923
A. AEPPLI
VARIABLE SPEED EPICYCLIC GEAR
Filed Feb. 20, 1926        6 Sheets-Sheet 5
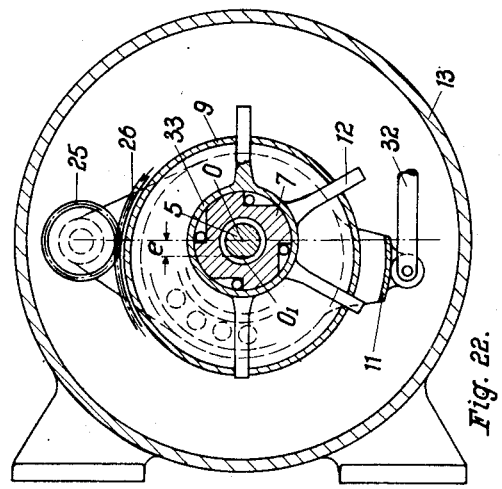
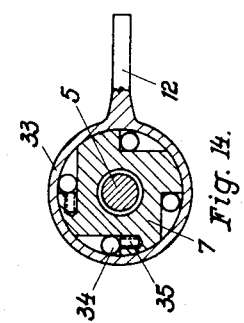
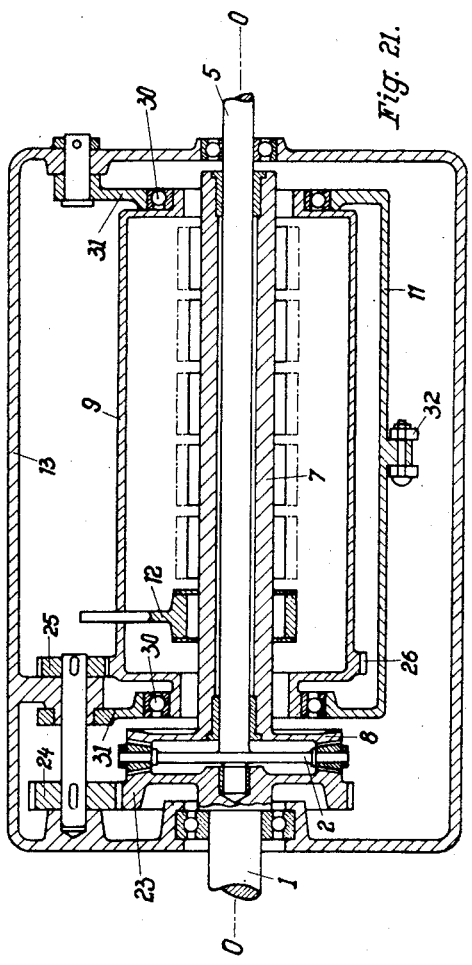
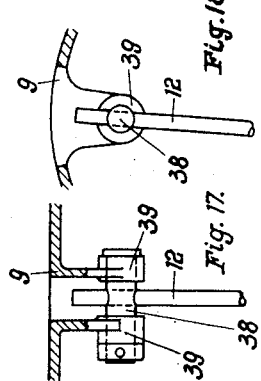
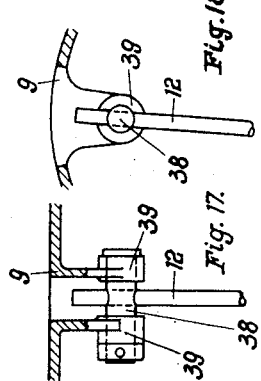
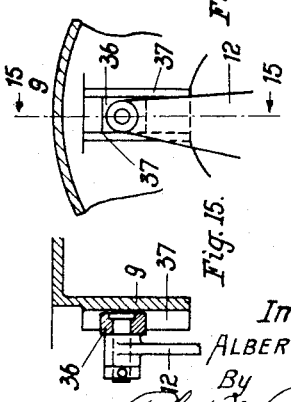
Inventor:
ALBERT AEPPLI
By
Robert M. Barr
Attorney Feb. 19, 1929.
A. AEPPLI
1,702,923
VARIABLE SPEED EPICYCLIC GEAR
Filed Feb. 20, 1926
6 Sheets-Sheet 6
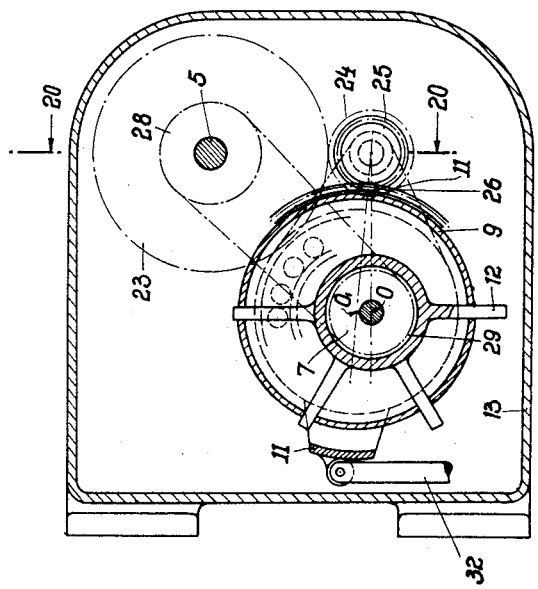
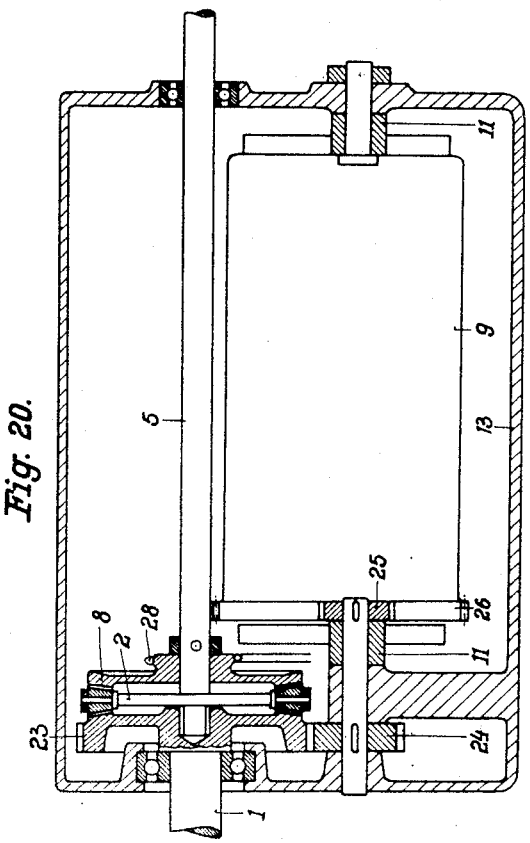
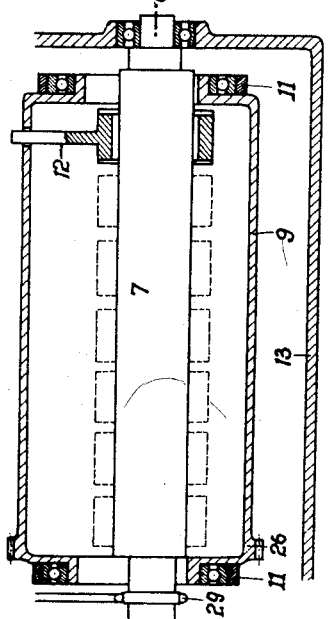
Inventor:
ALBERT AEPPLI
By
Robert M. Barr
Attorney Patented Feb. 19, 1929.

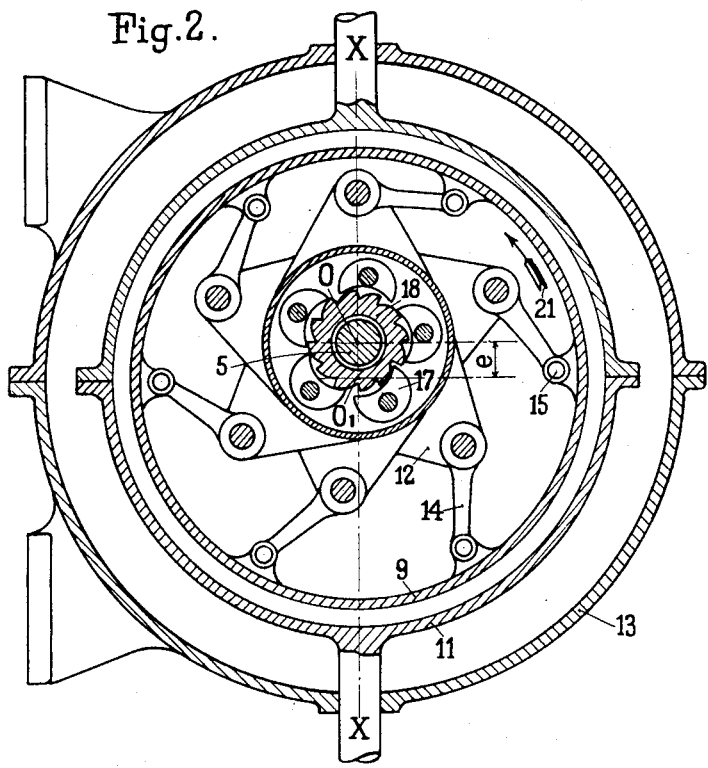
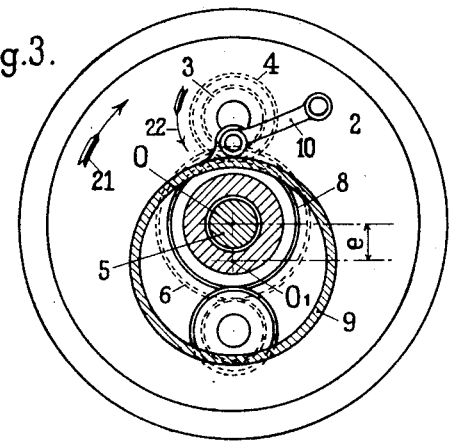

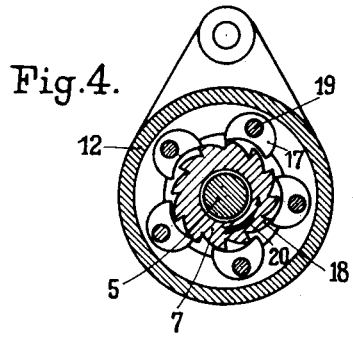
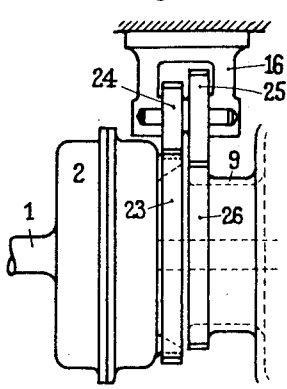
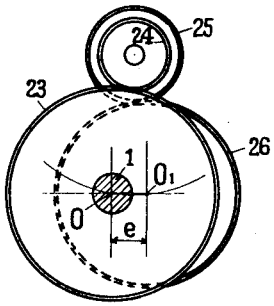
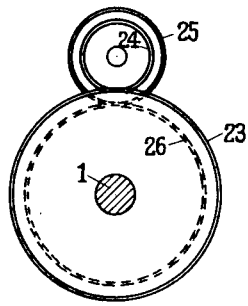
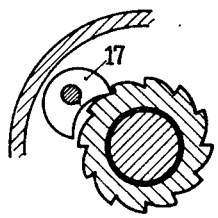
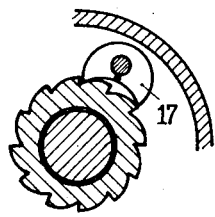
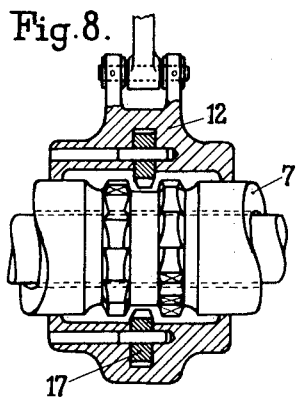

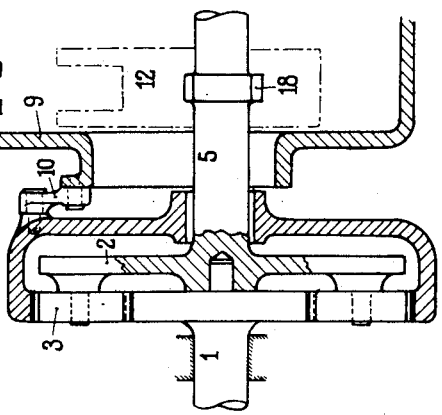
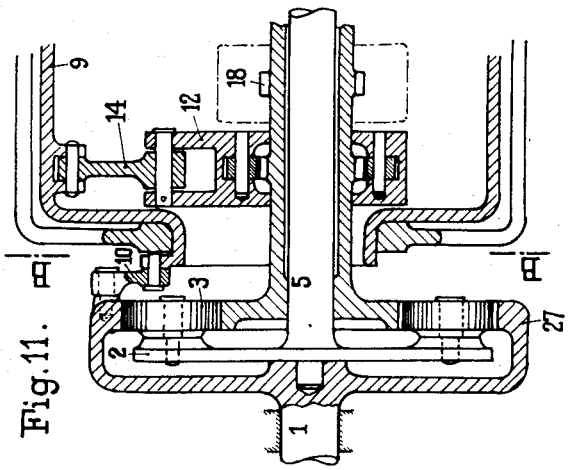
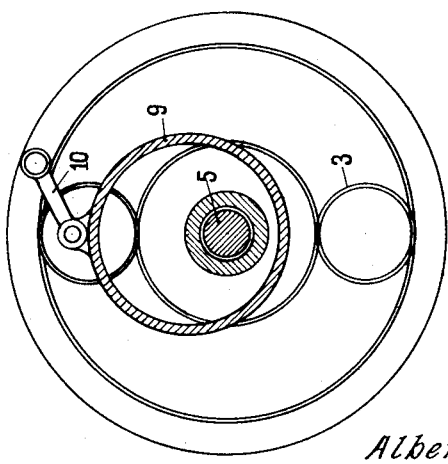

1,702,923

UNITED STATES PATENT OFFICE.

ALBERT AEPPLI, OF ZURICH, SWITZERLAND.

VARIABLE-SPEED EPICYCLIC GEAR.

Application filed February 20, 1926, Serial No. 89,808, and in Germany February 27, 1925.

The present invention relates to power transmitting mechanism and more particularly to a gear construction having a transmission ratio which can be varied at will within definite limits.

Some of the objects of the present invention are to provide an improved variable speed gear mechanism; to provide a variable speed gearing having an adjustable regulating member; to provide a gearing wherein the transmission ratio can be varied by changing the speed of one element relatively to another element of the gearing; to provide an improved epicyclic transmission control; to provide a power transmitting means wherein means including rotatable members on different axes are employed to operatively connect a driving shaft with a driven shaft, such means being so adjustable that the distance between the said axes of rotation may be varied at will; to provide a transmission mechanism whereby the driven members are interconnected with the driving members to cause the speed of one to exceed that of the other in proportion to the distance between the axes of rotation of two associated parts; to provide means operative in a gear transmission whereby losses caused by braking are avoided; and to provide other improvements as will hereinafter appear.

Various embodiments of the invention are illustrated by way of example, in the accompanying drawing, in which:—

Fig. 2 is a cross section of the gear shown in Fig. 1, and

Fig. 3 represents a section on line C—C of Fig. 1 viewed from the right, showing the arrangement of the epicyclic gear.

Fig. 4 is a detailed view of the ratchet mechanism shown in Figs. 1 and 2,

Fig. 5 is an elevation of a modification of the arrangement shown in Fig. 1, in which a train of gear wheels is employed as the connection between the drive shaft and one of the rotatable members.

Figs. 6 and 7 show diagrammatically the arrangement in two positions of the gear train illustrated in Fig. 5, Fig. 8 is an axial section of a modified ratchet device having teeth directed in opposite directions.

Figs. 9 and 10 illustrate diagrammatically in two cross sections the arrangement of said ratchet device.

Figs. 11 and 12 illustrate modifications of the epicyclic gear shown in Fig. 1,

Fig. 13 represents a section on line B—B of Fig. 11 viewed from the right.

Fig. 14 shows a detail on an enlarged scale.

Figs. 15 and 16 show a modification of the driving mechanism, Fig. 15 representing the section on the line 15—15 of Fig. 16.

Figs. 17 and 18 represent another modification of the driving mechanism in front and side view.

Fig. 19 shows a modified embodiment of the gear in a cross section.

Fig. 20 is the section on line 20—20 of Fig. 19; and

Figure 1:
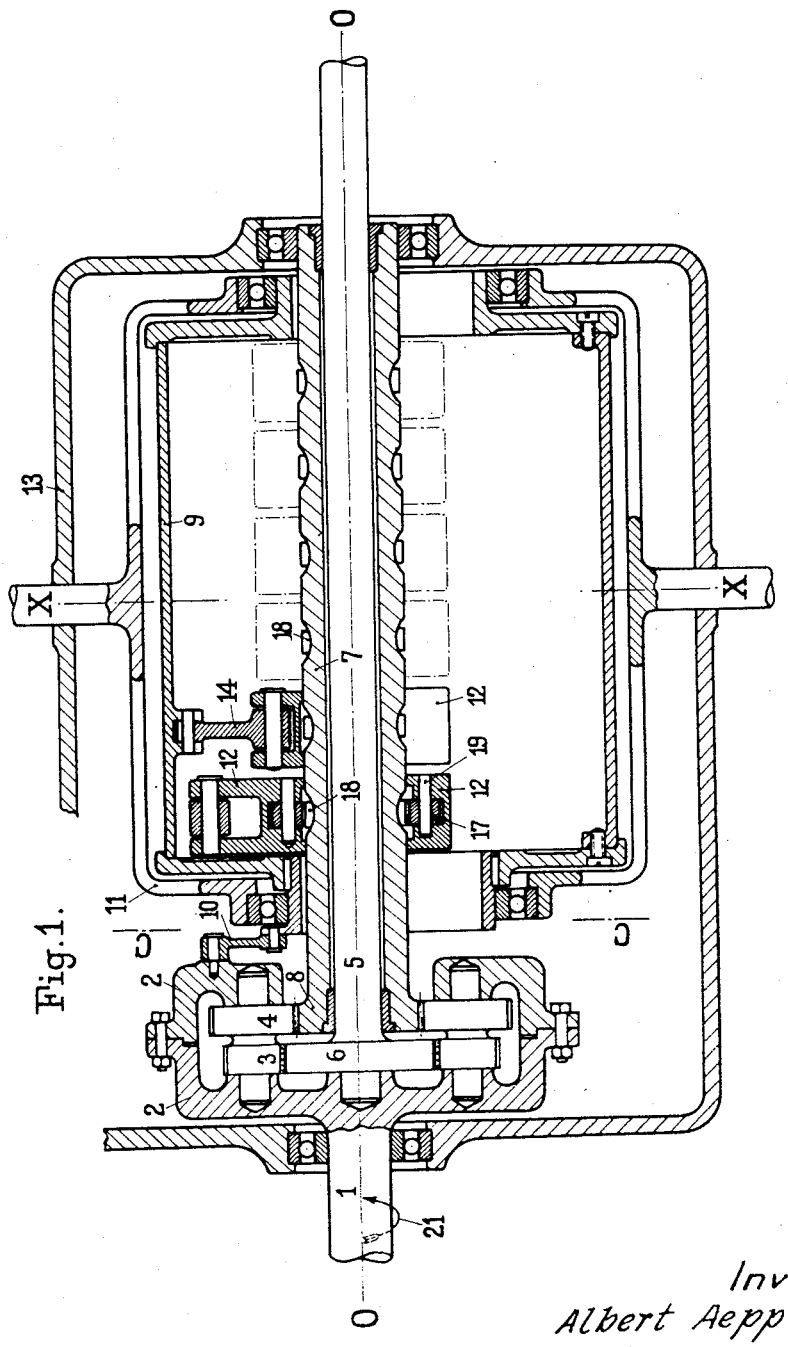
Fig. 1 is a longitudinal section of one embodiment of the invention.

Fig. 20$^a$ is the section on line 20$^a$—20$^a$ of Fig. 19, some of the driving mechanisms being diagrammatically indicated by dotted lines.

Fig. 21 depicts a longitudinal section of a modified embodiment of the invention; and Fig. 22 is a cross section of the gear illustrated in Fig. 21.

The planet wheels 3 and 4 are in rigid connection with one another and are mounted freely to rotate in the frame 2 (Fig. 1) forming one gear element of an epicyclic gear. The frame or gear carrier 2 is carried by the shaft 1 driven from the source of power, that is the live shaft. The planet wheels 3 mesh with a sun-wheel 6, the third gear element being preferably rigidly connected to the load shaft, while the planet wheels 4 engage a sun-wheel 8 forming the third gear element which is positively connected with a rotatable member formed in the represented embodiment by a hollow shaft 7. A second rotatable member 9 constructed in the form of a hollow drum and revolubly mounted in roller bearings supported by a casing 11 is linked to the frame 2 by means of a connecting rod 10 forming a positive driving connection between the rotatable member 9 and the gear element 2. The casing 11, whose axis $O_1$ (Fig. 2) coincides with that of the rotatable member 9, is connected by two rods X to a gear housing 13 which carries roller bearings for the member 7 and for the shaft 1. The rods X are shiftably mounted in the housing 13 and adjustable with respect to the same by any well known means not shown in the drawings. The housing 13, the rods X and the casing 11 form, in this way, an adjustable support for the roller bearings of the members 7 and 9, which support is adapted to keep said bearings in a stationary relative position which may be varied at will so as to change the distance between the axis 0 of the rotating member 7 and the axis $0_1$ of the rotating member 9 from zero to a predetermined amount $e$ (Fig. 2). Between the driving members 7 and 9 a plurality of circumferential driving mechanisms are arranged. Each of the mechanisms comprises a part 12, a one-way clutch 17, 18 and a driving element 14. The parts 12 are revolubly mounted side by side on the shaft 7 (Fig. 1). Each of the same is connected with the rotatable member 9 by means of said driving element which is preferably formed by a link 14. The pivotal points 15 to which said driving elements extend, are arranged on the member 9 on a circle and at uniform intervals from each other. Each of the parts 12 is provided with a one-way clutch comprising a number of pawls 17 which are mounted in a circle, to come into engagement successively with the teeth of a ratchet 18 arranged on the rotatable member 7.

The arrangement of the pawls is further illustrated separately in Fig. 4 in order to make the manner of operation quite clear. The pawls 17 (Figs. 2 and 4) are revolubly mounted on pivots 19 in a recess in the part 12 (Fig. 1) and the ratchet teeth and pawls are so dimensioned and arranged that when one edge of a pawl is situated over a ratchet tooth, the other edge of the pawl projects a certain amount into a tooth gap of the ratchet. When, therefore, the ratchet 18 and part 12 are moved together in the direction of the arrow 20, the edge of the pawl strikes against the operative side of a ratchet tooth and the ratchet 18, and consequently the member 7, is coupled with the part 12. On the other hand, during mutual movement in the opposite direction to the arrow 20, no coupling takes place but the pawls slide with a slight rotational movement over the ratchet teeth.

The gear operates as follows:

With the members 7 and 9 in the concentric position, that is, with the axes 0 and $0_1$ coinciding, the driving shaft is rotated in the direction of the arrow 21 (Figs. 1–3). The member 9, together with the parts 12, then also rotate in the same direction with the same speed, the member 7 being coupled with the member 9 by the pawls of the one-way clutches which engage with the ratchet teeth. The member 7 also rotates therefore and, therewith the sun-wheel 8, at the speed of the frame 2. The planet-wheels however remain stationary relatively to their own axes, that is, the rotation of the wheels of the planet gear is locked and the three gear elements, together with the rotatable members, rotate as one body about the gear axis 0. In this central position, in which the rate of rotations of the driven shaft 5 is the same as that of the driving shaft 1, none of the members of the device moves relatively to the others, that is, all the members are locked against relative movement.

If the member 9 is adjusted, as mentioned above, in such a manner that its axis $0_1$ is situated eccentrically in respect of the gear axis 0 (Fig. 2) then, with the driving shaft 1 rotating in the same direction 21, the regulating member 9 rotates in the same direction at the same rate of rotation but, however, about the axis $0_1$. Since in this position of the member 9 the pivotal points 15 revolve about the axis $0_1$ but the actuating member 12 about the axis 0, the pivotal points 15 move on a path eccentric of the axis of rotation of the shaft 7. Each of these points 15, therefore, approaches and recedes from the axis 0 once in each revolution so that the angle enclosed by a part 12 and its connecting link 14 decreases during a half revolution of the regulating member and increases during the other half, the part 12 thus being subjected to a reciprocatory or oscillatory motion relative to the member 9. As the resultant of the rotational and oscillatory movements a non-uniform rotation of the part 12 is obtained.

It is clear from Fig. 2 that when the part 12 oscillates in the direction of the arrow 21 with respect to the member 9, the pawls engage with the ratchet teeth and couple the part 12 with the shaft 7. At the moment in which the part 12 is executing, besides its rotational movement, this additional oscillation in the direction of rotation 21 of the member 9, its angular velocity is greater than that of the member 9. Therefore at this moment the member 7 is coupled to the part 12 and therewith the sun wheel 8 is rotated with an angular velocity greater than that of the member 9 or the frame 2. In this case (Fig. 3) the planet wheels 3, 4 must execute rotatory movements in the direction of the arrow 22, and the sun wheel 6 an additional rotational movement in the direction of rotation of the frame, the speed of rotation of the driven shaft 5 thus being increased.

In order that the speed of rotation of the shaft 5 shall not fall off again during the return movement of the oscillation of the actuating member 12 (this occurring on the further rotation of the member 9) a plurality of parts 12 (Fig. 2) are arranged in a circle, each of which executes the same phase of the oscillation with a displacement in time relatively to the others. The individual parts thus come successively into operation, couple up with the shaft 7 and take it with them.

Since the angular velocity of each part 12 is constantly altering in the course of one revolution, it also alters by a certain amount while it is coupled with the shaft 7. This variation in velocity is the smaller, the smaller the angle of rotation is through which the part 12 is connected with the shaft 7; and this angle is the smaller, the greater the number of actuating members. By increasing the number of parts 12 it is possible therefore to increase at will the uniformity of the rotation of the shaft 7 and thereby of the driven shaft 5. A further means for making the transmission more uniform and agreeable is the insertion of resilient members, such as springs, in some part of the operative connection between control members and driven shaft. Also for the purpose, a fly-wheel may be arranged upon the driven shaft.

The greater the eccentricity $e$ the greater the variation in angular velocity of the parts 12 in the course of a revolution, and, the more is the rate of rotation of the driven shaft 5 increased for the same rate of rotation of the driving shaft 1 and the greater is the transmission ratio of the gear. Since the adjustment of the axis of rotation $0_1$ of the member 9 can be effected continuously in known manner the gear ratio may therefore be continuously varied.

In the above explanation of the operation of the gear uniform velocity of the regulating rotatable member 9 was tacitly assumed. The connection thereof to the frame 2 through the rod 10 causes, however, when the rotatable member is eccentrically situated, a variable velocity which results in a similar motion of the driven shaft 5. This is unallowable in high speed gears. Constant angular velocity of the member 9 is obtained if, for example, a train of gears (Figs. 5–7) is provided as the connecting link between the member 9 and frame 2. The toothed ring 23 attached to the gear element 2 transmits the torque to the pinion 24 which is mounted in the support 16 which is stationary in space and through the wheel 25 to the toothed ring 26 fixedly connected with the member 9. The change of the eccentricity of the rotatable member 9 is in this case preferably accomplished by adjustably mounting the rotatable member 9 in such a manner that its axis 0 may be displaced along a circle concentrical with the pinion 24 as shown in Fig. 6. Fig. 6 shows the arrangement with the member 9 arranged eccentrically of the gear axis, Fig. 7, with it central. The train of toothed wheels might naturally be replaced by a belt or chain gear.

If the transmission ratio of the gear is chosen so that speed of rotation of the member 9 is less than that of the driving shaft 1 of the gear then, in the case in which the member 9 is central in respect of the gear axis 0, that is, when the member 9 and the member 7 driven thereby are coupled together and rotate as a whole, the sun wheel 8 (Fig. 1) has a lower speed of rotation than the frame 2 or the driving shaft 1. In this case the speed of rotation of the driven shaft 5 is less than that of the driving shaft 1. If in such a gear the member is moved so as to be eccentric of the axis 0 of the member 7, so that the driving mechanisms 12, 14, 17, 18 come into operation, then the speed of rotation of the sun-wheel 8 increases relatively to that of the member 9 in the measure in which the eccentricity $e$ is increased. The speed of rotation of the driven shaft 5 also increases accordingly. In dependency on the amount of the eccentricity $e$ and the gear ratio of the train of gears and of the wheels of the planet gear, the speed of rotation of the driven shaft may be increased to that of the driving shaft or even thereabove.

The one-way clutch (Fig. 8) may also be constructed with two ratchets, one of which is provided with teeth acting in one direction (Fig. 9) and the other in the opposite direction (Fig. 10) and the part 12 may be made to be capable of longitudinal (Fig. 8) movement so as to be adjusted at will to cooperate alternatively with the one or the other ratchet. This reversible clutch is provided for reversed direction of rotation of the driven shaft 5 and is necessary in such cases in which, without alternation in the direction of rotation, live shaft and load shaft exchange functions. This is, for example, so in a motor car drive in which in one case the engine drives the vehicle and in the other case, during braking, by means of the engine, the vehicle tends to drive the engine. If the engine is driving, then the one coupling is employed, but if it is to be used for braking then the other coupling is thrown in.

If the driving and the driven shafts exchange their functions, also the mode of operation of the rotatable members will be reversed. While in the one case the member 9 will drive the member 7 by way of the driving mechanisms, in the reverse case the drive of the member 9 is performed from the member 7 by way of the driving mechanism. The gear is therefore reversible, that is to say it may be driven from the driving shaft, for instance as reduction gear, and also operate in reversed direction as a speed increasing gear, if driven from the other side. If the increase of the eccentricity of the regulating member in the one case will result in an increase of speed, there will be a reduction of speed in the other case.

A further construction of the gear is illustrated in Fig. 11. This arrangement and construction of the rotatable member 9 and 7 and of the driving mechanisms 12, 14, 17, 18 are identical with those according to Figs. 1–3. The member 9 is similarly, as in Fig. 3, connected by a rod 10 with one gear element of the epicyclic gear which element, however, in contradistinction to the gear according to Figs. 1–3, is formed by an internally toothed sun wheel 27 mounted on the driving shaft 1. The second gear element is formed by the frame 2 supporting the planet wheels and is mounted on the driven shaft 5. The third gear element is formed by a sun gear which is mounted on the shaft 1.

In the embodiments shown in Figs. 1 to 11 the inner rotatable member 7 is positively connected with a sun gear. Fig. 12 illustrates a further construction in which the inner rotatable member is positively connected with the planet gear carrier 2 and is integral with the driven shaft. The hollow rotatable member 9 is connected with a second gear element formed by an internally toothed sun wheel. The driving shaft 1 is connected with the third gear element formed by a second sun wheel.

As one-way clutches, devices with ratchets and pawls are assumed in each case in the description and illustrations but any other coupling acting in one direction only, that is, so called clamping clutches, might be employed. In Fig. 14 an embodiment of such a clutch is represented. Similarly only epicyclic gears with pinions, sun wheels and internally toothed wheels are illustrated and described but epicyclic gears with bevel gears might be equally well employed. Such an embodiment is shown in Figs. 14, 21 and 22. The epicyclic gear is composed of the three coaxially rotating gear elements 23, 2 and 8. The gear elements 23 and 8 are formed by gears rotating about a stationary axis. Such gears are called "sun gears" hereinafter for sake of simplicity. The gear element 2 is a carrier for planet gears the axes of which are revolving. In this embodiment all gears are of the bevel type. The sun gear 23 is connected with a driving shaft 7 and has, furthermore, a positive driving connection with a hollow rotatable member 9, which connection is formed by pinion 24 engaging the toothed rim of the gear element 23 and rotating in unison with a gear 25 which engages a toothed rim 26 of the rotatable member 11. The second rotatable member 7 is connected with the gear element 8 so as to rotate coaxially with the epicyclic gear about the axis 0 and is supported by the driven axle 3 which is connected with the gear element 2. The member 9 is rotating in bearings 30 located in a support 11 which is so mounted in the housing 13 as to swing about the axis of the pinions 24 and 25. A rod 32 attached to the support 11 is adjustable with respect to the housing 13 by any well known means not shown in the drawings. By adjusting the rod 32 the stationary position of the axis $O_1$ of the member 9 relative to the axis 0 may be varied at will so as to change the distance $e$ between these axes from zero to a certain amount.

The driving mechanisms causing the member 7 to exceed in speed the member 9 by an amount increasing with the distance $e$ comprise annular parts 33, each of which is integral with a driving element in form of an arm 12 extending outwardly through a slot in the member 9. A one-way clutch of the clamping type, shown on enlarged scale in Fig. 14, is provided between the annular part 33 and the member 7. The one-way clutch comprises balls 34 inserted in recesses of the member 7 and urged by springs 35 into the tapered space between the one side of those recesses and the annular part 34. The function of clutches of this type is too well known to need any description. Moreover, the connection between the parts 12 and the member 9 may be effected in a manner other than that shown in the above described embodiments. It is possible, for example, to provide radially disposed recesses in the member 9, and to guide the ends of arms therein. In this case the driving element cooperating with the part 12 and extending therefrom to a definite point of the rotatable member 9 would be formed by an arm integral with the part 12. The Figures 15 to 18 illustrate embodiments of that kind; 12 designates the arm integral with the annular part 33. According to Figures 15 and 16, the end of the arm carries a guiding block 36 guided between radial ribs 37. According to Figures 17 and 18, the end of the arm 12 is so mounted as to slide in a slot of an axle 38 carried by bearings 39 of the member 9.

Instead of arranging the rotatable member 7 concentrically with the axis 0 of the epicyclic gear this may be disposed, together with the member 9 driven from one of the epicyclic gear elements at a certain distance therefrom and parallel to the axis. In this case a separate positive driving connection between the rotatable members 7 and 9 and the epicyclic gear elements would have to be provided in the form of toothed wheels, chains, or the like.

An embodiment of such a construction is represented in Figs. 19, 20 and 20ª.

The epicyclic gear of the well known bevel gear type comprises the two sun gears 23 and 8, and the planet gear carrier 2. The sun gear 23 is connected with the driving shaft 1, and the carrier 2 with the driven shaft 5. The other sub gear 8 has a positive driving connection with the inner rotatable member 7 stationarily journalled in the housing 13 (Fig. 20ª). The driving connection is formed in this embodiment by a chain engaging the sprocket gears 28 and 29 attached to the sun gear and the member 7 respectively. The sun gear 23 has, furthermore, a positive driving connection with the hollow rotatable member 9 journalled in an adjustable support 11. This connection is formed by pinions 24, 25 similar to the embodiment shown in Figs. 5 to 7, the pinion 25 engaging a toothed rim 26 of the member 9. As shown in Figs. 19 and 20, the support 11 is so supported in the housing 13 as to swing about the axis of the pinions 24, 25, and is held stationary by means of an adjustable rod 32. By adjusting that rod by any well known means not shown in the drawing, the distance of the axes 0 and $0_1$ may be changed as desired. The driving mechanisms comprising the elements 12 have the same construction as in the embodiment shown in Figs. 21 and 22 and are, therefore, not represented in all details.

What I claim is:

1. A variable speed gear comprising a rotatable member rotating about an axis, a second rotatable member, driving mechanisms each composed of a part arranged to swing about said first axis, of a reversible one-way clutch adapted to be reversed at will so as to clutch said part to the first named rotatable member in one alternative direction of rotation, and of a driving element cooperating with said part and extending therefrom to a definite point of the second rotatable member, thereby imparting to said part an oscillation relative to said second rotatable member the amplitude of which depends on the above mentioned distance, the driving mechanisms being so disposed with respect to each other that their respective definite points are circumferentially distributed on the second rotatable member.

2. A variable speed gear comprising an epicyclic gear composed of three coaxially rotating gear elements, two being formed by sun gears and one by a planet gear carrier, a driving shaft having a positive driving connection with one of said gear elements, a driven shaft having a positive driving connection with another of said gear elements, and means operatively, permanently, and continuously connected in a positive manner to the three elements and to one of said shafts and arranged to vary the ratio of rotation of the third gear element relative to one of the other gear elements whereby the transmission ratio of the gear and the rate of rotation of the driven shaft with respect to the rate of rotation of the driving shaft can be positively and definitely varied within limits, said means consisting of a rotatable member rotating about an axis, a second rotatable member rotating about a second axis parallel to the first, said two rotatable members being so mounted with respect to each other that the distance between their axes can be varied, one of said members having a positive driving connection with the aforesaid third gear element and the other member with one of the aforesaid gear elements other than said third one, bearing means for both members, and an adjustable support for at least one of the bearing means arranged to keep the same fixed in any given stationary position and to be capable of adjustment to change the distance between the axes of the two said rotatable members and a plurality of driving mechanisms situated in different planes which are substantially parallel to each other, said driving mechanisms being disposed at positions staggered circumferentially with respect to each other and being cooperatively associated in coordinated relation to both members to cause one member to exceed the speed of the other member by an amount proportional to the distance between their axes.

3. A variable speed gear comprising an epicyclic gear composed of three coaxially rotating elements being formed by a first sun gear, by a second sun gear, and by a planet gear carrier, a driving shaft, a driven shaft, one of said shafts having a positive driving connection with said planet gear carrier and the other shaft with said first sun gear, and means operatively, permanently, and continuously connected in a positive manner to said second sun gear and to one of said shafts and arranged to vary the ratio of rotation of the third gear element relative to one of the other of said gear elements whereby the transmission ratio of the gear and the rate of rotation of the driven shaft with respect to the rate of rotation of the driving shaft can be positively and definitely varied within definite limits, said means consisting of a first rotatable member rotating about an axis, a second rotatable member encompassing said first rotatable member and rotating about a second axis parallel to the first, said two rotatable members being so mounted with respect to each other that the distance between their axes can be varied, one of said members having a positive driving connection with the aforesaid second sun gear and the other member with another one of the aforesaid gear elements, bearing means for both members, an adjustable support for at least one of the bearing means adapted to keep the same fixed in any given position and to be capable of adjustment to change the distance between said axes, and a plurality of mechanisms situated in different planes which are substantially parallel to each other, said driving mechanisms being disposed at positions staggered circumferentially with respect to each other and cooperatively associated in coordinated relation to both members to cause one member to exceed the speed of the other member by an amount proportional to the distance between their axes.

4. In a compact variable speed gear with a continuously variable speed ratio the combination comprising an epicyclic gear composed of three coaxially rotating gear elements being formed by a first sun gear, by a second sun gear, and by a planet gear carrier, a driving shaft, a driven shaft, one of said shafts having a positive driving connection with said planet gear carrier and the other shaft with said first sun gear, and means permanently, operatively and continuously connected in a positive manner to said second sun gear and to one of said shafts and to the driven shaft and arranged to vary the ratio of rotation of the third gear element relative to one of the other of said gear elements whereby the transmission ratio of the gear and the rate of rotation of the driven shaft with respect to the rate of rotation of the driving shaft can be positively and definitely varied within definite limits, said means consisting of a first rotatable member rotating about the axis of the driven shaft and having a positive driving connection with the aforesaid second sun gear, a second rotatable member encircling said first rotatable member and said driven shaft and rotating about a second axis parallel to the first and having a positive driving connection with one of the aforesaid gear elements other than said second sun gear, said two rotatable members being so mounted with respect to each other that the distance between their axes can be varied, stationary bearing means for said first rotatable member, adjustable bearing means for said second rotatable member whereby the distance between said axes can be changed from zero to a predetermined amount, a parallel series of driving mechanisms arranged circumferentially in equidistant staggered relationship and connected with both rotatable members in such a manner as to cause the first to exceed the speed of the second one by an amount which is proportional to the distance between their axes and which is zero when said distance is zero.

5. A compact variable speed gear comprising an epicyclic gear composed of three coaxially rotating gear elements, two being formed by sun gears and one by a planet gear carrier, a driving shaft having a positive driving connection with one of said gear elements, a driven shaft having a positive driving connection with another of said gear elements, and means operatively, permanently, and continuously connected in a positive manner to the three elements and to one of the said shafts and arranged to vary the ratio of rotation of the third gear element relative to one of the other of said gear elements whereby the transmission ratio of the gear and the rate of rotation of the driven shaft with respect to the rate of rotation of the driving shaft can be positively and definitely varied within definite limits, said means consisting of a rotatable member mounted on said driven shaft and rotating about the axis thereof, a second rotatable member rotating about a second axis parallel to the first, said two rotatable members being so mounted with respect to each other that the distance between their axes can be varied within definite limits, one of said members being positively connected with the aforesaid third gear element so as to rotate with a proportional speed, and the other member being positively connected with one of the aforesaid gear elements other than said third one so as to rotate with a proportional speed, bearing means for both members, an adjustable support for at least one of the said bearing means encircling said first rotatable member and driven shaft and adapted to keep the same fixed in any given stationary position and to be capable of adjustment to change the distance between said axes, and a plurality of driving mechanisms positioned side by side and substantially transverse to the axis of the driven shaft, said driving mechanisms being disposed circumferentially about said axis at substantially equidistant staggered positions and being operatively associated with both said rotatable members to effect a change in speed.

6. A compact variable speed gear comprising an epicyclic gear composed of three coaxially rotating gear elements, two being formed by sun gears and one by a planet gear carrier, a driving shaft having a positive driving connection with one of said gear elements, a driven shaft having a positive driving connection with another of said gear elements, and means permanently, continuously, and operatively connected in a positive manner to the three said elements and to one of the shafts and arranged to vary the ratio of rotation of the third gear element relative to one of the other of said gear elements whereby the transmission ratio of the gear and the rate of rotation of the driving shaft can be positively and definitely varied within definite limits, said means consisting of a rotatable hollow member rotating about an axis, a second rotatable member rotating about a second axis parallel to the first, said two rotatable members being so mounted with respect to each other that the distance between their axes can be varied within definite limits, a gear attached to one of the aforesaid elements in a concentric position, a pinion meshing with said gear, said first mentioned hollow member being so connected with said pinion as to rotate proportionally thereto and being so adjustably mounted that its axis can be displaced along a circle concentrical with said pinion, said other rotatable member being arranged within the hollow member concentrical to the aforesaid gear elements and having a positive driving connection with one of said gear elements, a plurality of driving mechanisms located in different planes which are parallel to each other, said driving connections being cooperatively associated in co-ordinate relation to both members and arranged circumferentially within said hollow rotatable member in equidistant staggered relation with respect to each other to cause the one to exceed the speed of the other, the driving and driven shafts each being in positive driving connection with a different one of said gear elements.

7. In a compact variable speed gear, the combination comprising an epicyclic gear composed of three coaxially rotating gear elements, a rotatable member in a permanent positive driving connection with one of said gear elements to rotate about an axis, a second drum-shaped rotatable member in permanent positive driving connection with another one of said gear elements and surrounding said first mentioned rotatable member to rotate about a second axis parallel to said aforementioned axis, said two rotatable members being so mounted with respect to each other that the distance between their axes can be varied within definite limits, an adjustable support for at least one of said rotatable members to keep the same fixed in any given position and arranged to be capable of adjustment to change the distance between said axes, more than four driving mechanisms situated side by side in different planes which are substantially parallel to each other, said driving mechanisms being disposed circumferentially within said drum-shaped member at equidistant staggered positions and being cooperatively associated in coordinated relation to both members to cause one member to exceed the speed of the other member by an amount proportional to the distance between their axes, said driving mechanisms being arranged in juxta-position with regard to each other.

8. A compact variable speed gear comprising an epicyclic gear composed of three coaxially rotating gear elements, a driving shaft and a driven shaft each connected to one of said gear elements in concentric relation to the axis of said epicyclic gear, a drum in permanent driving connection with one of said gear elements and rotatable about an axis parallel to the axis of said shafts and surrounding one of them, a hollow shaft mounted within said drum on said surrounded shaft and permanently and continually connected to one of said gear elements other than that connected to said drum, said two rotatable members being so mounted with respect to each other that the distance between their axes can be varied within definite limits, an adjustable support for said drum to keep the same fixed in any given position and arranged to be capable of adjustment to change the distance of said axes, and more than four driving mechanisms situated in different planes which are parallel to each other and close together, said driving mechanisms being arranged circumferentially within said drum at positions staggered equidistant from each other and distributed over the length of said drum and coordinated to the same and to the said hollow shaft to cause the latter to exceed the speed of said drum by an amount proportional to the distance between the two shafts.

In testimony whereof I have affixed my signature.

ALBERT AEPPLI.